US006215514B1

(12) United States Patent
Harris

(10) Patent No.: US 6,215,514 B1
(45) Date of Patent: Apr. 10, 2001

(54) INGRESS MONITORING SYSTEM

(75) Inventor: James E. Harris, Indianapolis, IN (US)

(73) Assignee: Trilithic, Inc., Indianapolis, IN (US)

( * ) Notice: Subject to any disclaimer, the term of this patent is extended or adjusted under 35 U.S.C. 154(b) by 0 days.

(21) Appl. No.: 09/093,244

(22) Filed: Jun. 8, 1998

Related U.S. Application Data

(60) Provisional application No. 60/051,148, filed on Jun. 27, 1997.

(51) Int. Cl.[7] .......... H04N 7/10

(52) U.S. Cl. .......... 348/6; 348/192

(58) Field of Search .......... 348/191, 192, 348/193, 6, 7, 10, 12, 13; 455/3.1, 5.1

(56) References Cited

U.S. PATENT DOCUMENTS

| | | |
|---|---|---|
| 2,291,533 | 7/1942 | Cummings . |
| 3,345,560 | 10/1967 | Perkins . |
| 3,368,031 | 2/1968 | Eisele . |
| 3,629,510 | 12/1971 | Anderson et al. . |
| 3,711,767 | 1/1973 | Campbell, Jr. et al. . |
| 3,731,203 | 5/1973 | Lieberman . |
| 3,750,022 | 7/1973 | Curry et al. . |
| 3,842,663 | 10/1974 | Harting et al. . |
| 3,846,703 | 11/1974 | Stewart et al. . |
| 3,886,454 | 5/1975 | Oakley et al. . |
| 3,924,187 | 12/1975 | Dormans . |
| 3,947,769 * | 3/1976 | Rousos et al. . |
| 4,072,899 | 2/1978 | Shimp . |
| 4,237,486 | 12/1980 | Shimp . |
| 4,413,229 | 11/1983 | Grant . |
| 4,429,578 | 2/1984 | Darrel et al. . |
| 4,461,024 * | 7/1984 | Rengger et al. .......... 381/46 |
| 4,491,968 | 1/1985 | Shimp et al. . |
| 4,520,508 | 5/1985 | Reichert, Jr. . |
| 4,609,866 | 9/1986 | Loftness . |
| 4,656,353 * | 4/1987 | Thompson . |
| 4,670,789 | 6/1987 | Plume . |
| 4,731,586 | 3/1988 | Perkins . |
| 4,775,839 | 10/1988 | Kosina et al. . |
| 4,810,961 | 3/1989 | Takahashi et al. . |
| 4,814,694 | 3/1989 | Takahashi et al. . |
| 4,920,533 | 4/1990 | Dufresne et al. . |
| 4,962,358 | 10/1990 | Svetanoff . |
| 4,982,440 | 1/1991 | Dufresne et al. . |
| 5,020,134 | 5/1991 | Pecaut . |
| 5,126,840 | 6/1992 | Dufresne et al. . |
| 5,208,665 | 5/1993 | McCalley et al. . |

(List continued on next page.)

OTHER PUBLICATIONS

Characterization of Cable TV Networks as the Transmission Media for Data, Archer S. Taylor, IEEE Journal On Selected Areas in Communications, vol. SAC–3, No. 2, Mar. 1985, pp. 255–265.

*Primary Examiner*—Nathan Flynn
(74) *Attorney, Agent, or Firm*—Barnes & Thornburg

(57) ABSTRACT

A system (10) for monitoring the ingress of noise into the return path (14) of a two-way CATV network comprises a detector circuit (16, 116) coupled to the return path (14) to receive a signal from the return path (14). The detector circuit (16, 116) provides an output signal indicative of the signal coupled from the network. A peak follower circuit (20, 120) coupled to the detector circuit (16, 116) stores a peak detected output signal from the detector circuit (16, 116). Illustratively, the peak follower circuit (20, 120) is coupled to the detector circuit (16, 116) through a filter circuit having a passband, for example, a low pass filter (18, 118). The peak follower circuit (20, 120) stores a peak detected output signal within the passband. A mixer (128) may be included for mixing the signal from the network with a local oscillator (126) frequency to produce a mixed signal, and for supplying the mixed signal to the detector circuit (16, 116).

44 Claims, 3 Drawing Sheets

U.S. PATENT DOCUMENTS 5,210,497 5/1993 Regini .
5,210,498 5/1993 Paananen .
5,251,324 10/1993 McMullan, Jr. .
5,255,086 10/1993 McMullan, Jr. et al. .
5,294,937 3/1994 Ostteen et al. .
5,321,849 6/1994 Lemson .
5,493,210 2/1996 Orndorff et al. .
5,585,842 12/1996 Chappell et al. .
5,608,428 3/1997 Bush .

* cited by examiner

TO HEADEND MODEM
TO CONTROLLER 22
LO. OUT
LO. IN
OUT
IN
INGRESS SENSOR
112
RF OUT
RETURN FIBER RECEIVER
146
144
138
PROGRAMMING SOURCES
SYNTHESIZED LOCAL OSCILLATION
126
10

INGRESS MONITORING SYSTEM

This application is a continuation of provisional application 60/051,148 filed on Jun. 27, 1997.

1. Field of the Invention

This invention relates to systems for determining the quality of a communication network. It is disclosed in the context of a CATV system having a return path from each subscriber's terminal, but is believed to have utility in other applications as well.

2. Background Art

The importance of leakage detection and repair in CATV systems is well documented. See, for example, U.S. Pat. No. 4,072,899 and U.S. Pat. No. 5,608,428. The invention relates to a continuous ingress monitoring system which performs ingress detection. The system can be configured to detect total, peak RF power in the return path frequency spectrum. This permits detection of the conditions that cause laser clipping in cable systems that include fiber optic legs. The system further can be configured to detect peak ingress power within specific bands. This permits detection of ingress of the frequencies most likely to disrupt transmissions through, for example, the fiber optic return path of a CATV network.

DISCLOSURE OF THE INVENTION

According to the invention, a noise monitoring system comprises a detector circuit coupled to a signal source. The detector circuit provides an output signal indicative of the signal coupled from the source. A peak follower circuit is coupled to the detector circuit for storing a peak detected output signal from the detector circuit.

According to an illustrative embodiment of the invention, the peak follower circuit is coupled to the detector circuit through a filter circuit having a defined frequency range, or passband. The peak follower circuit stores a peak detected output signal within the defined frequency range.

Further according to an illustrative embodiment of the invention, the filter circuit comprises a low pass filter circuit.

Additionally according to an illustrative embodiment, the system further comprises a mixer for mixing the signal from the signal source with a local oscillator frequency to produce a mixed signal, and for supplying the mixed signal to the detector circuit.

According to an illustrative embodiment, the mixed signal is supplied to the detector circuit through a low pass filter.

Additionally according to an illustrative embodiment, the peak follower circuit has a characteristic attack time so that the peak follower circuit stores a peak detected output signal having a defined minimum duration from the detector circuit.

Further according to an illustrative embodiment, the system comprises a controller coupled to the peak follower circuit and configured to receive the amplitude of the stored peak signal.

According to an illustrative embodiment, the controller is configured to receive the amplitude of the stored peak signal periodically.

Additionally according to an illustrative embodiment, the controller is further configured to generate a message if the amplitude of the stored peak signal exceeds a defined threshold.

Further according to an illustrative embodiment, the system comprises a plurality of detectors and a plurality of peak follower circuits. The controller comprises a controller for sequentially interrogating the plurality of peak follower circuits, for receiving the amplitudes of the stored peak signals from the peak follower circuits in response to the sequential interrogation, for deleting the amplitudes of the stored peak signals after their respective amplitudes have been received, and then for repeating this cycle.

According to illustrative embodiments, the signal source is the return path of a two-way CATV system.

BRIEF DESCRIPTION OF THE DRAWINGS

The invention may best be understood by referring to the following detailed description and accompanying drawings which illustrate the invention. In the drawings.

DETAILED DESCRIPTIONS OF ILLUSTRATIVE EMBODIMENTS

Figure 1:
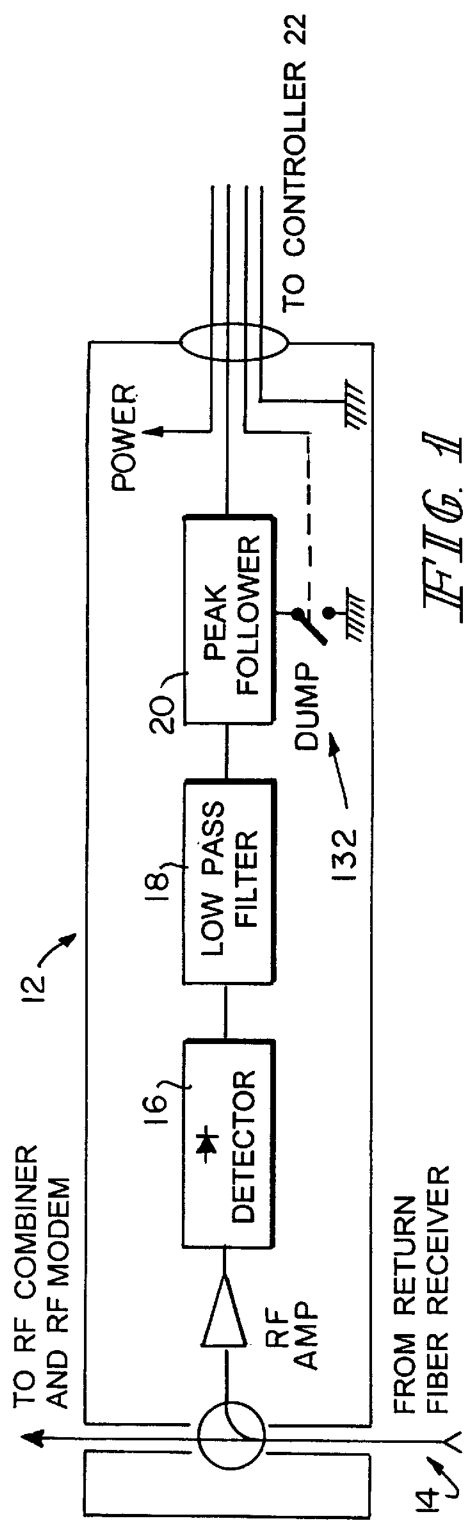
FIG. 1 illustrates a partly block and partly schematic circuit diagram of a component of a system constructed according to the invention.
Figure 2:
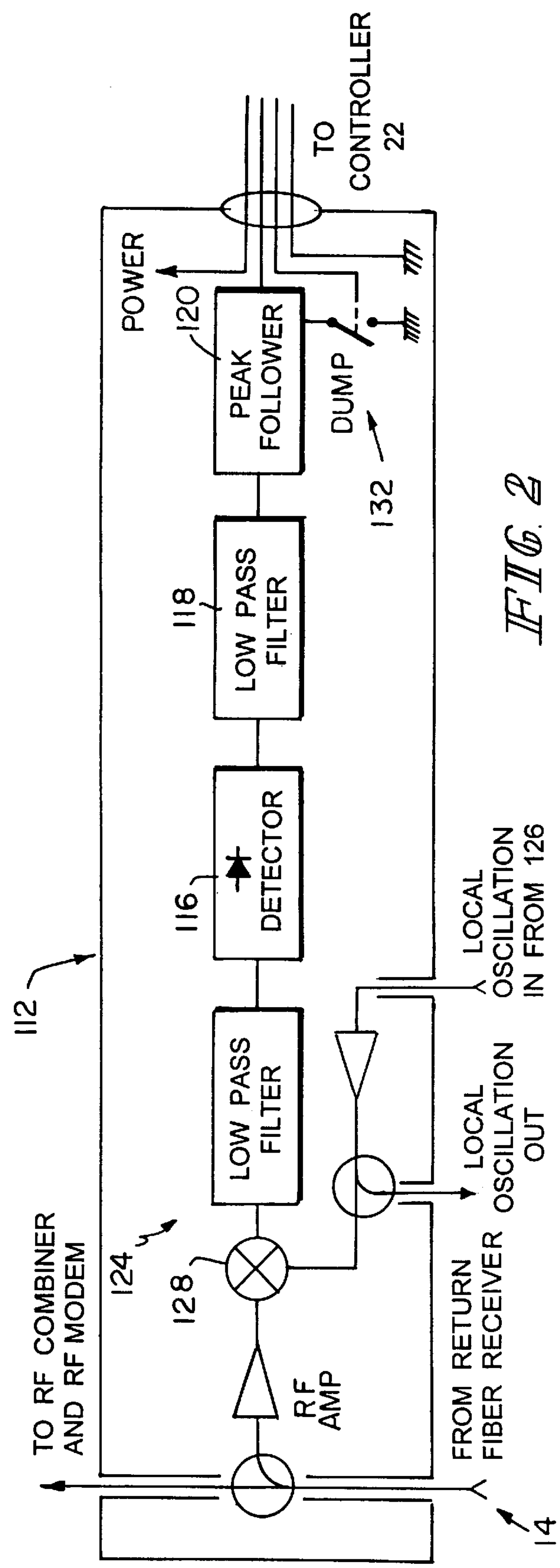
FIG. 2 illustrates a partly block and partly schematic circuit diagram of a component of a system constructed according to the invention.
Figure 3:
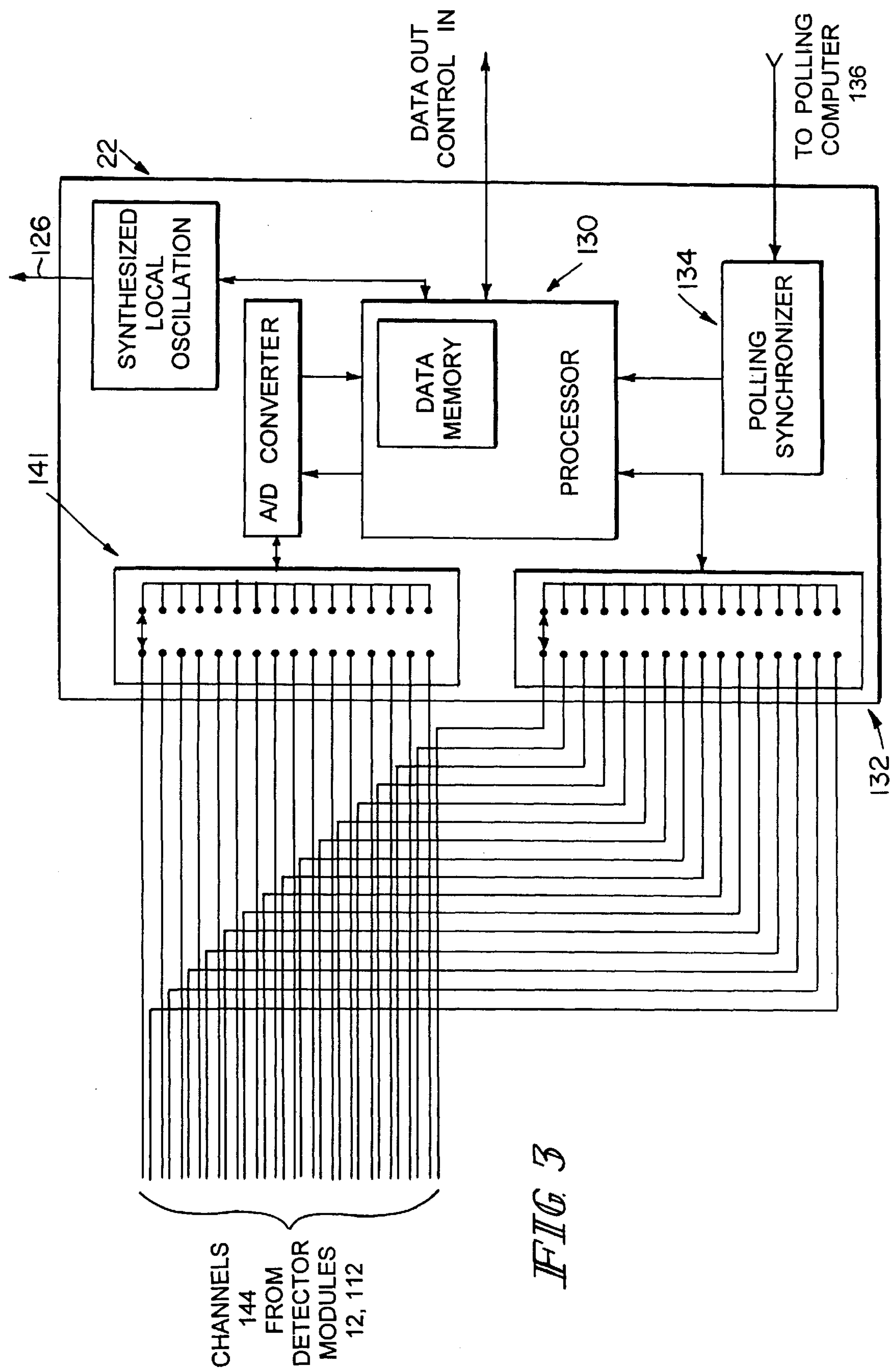
FIG. 3 illustrates a partly block and partly schematic circuit diagram of a component of a system constructed according to the invention; and, FIG. 4 illustrates a partly block and partly schematic circuit diagram of a portion of a system constructed according to the invention.
Figure 4:
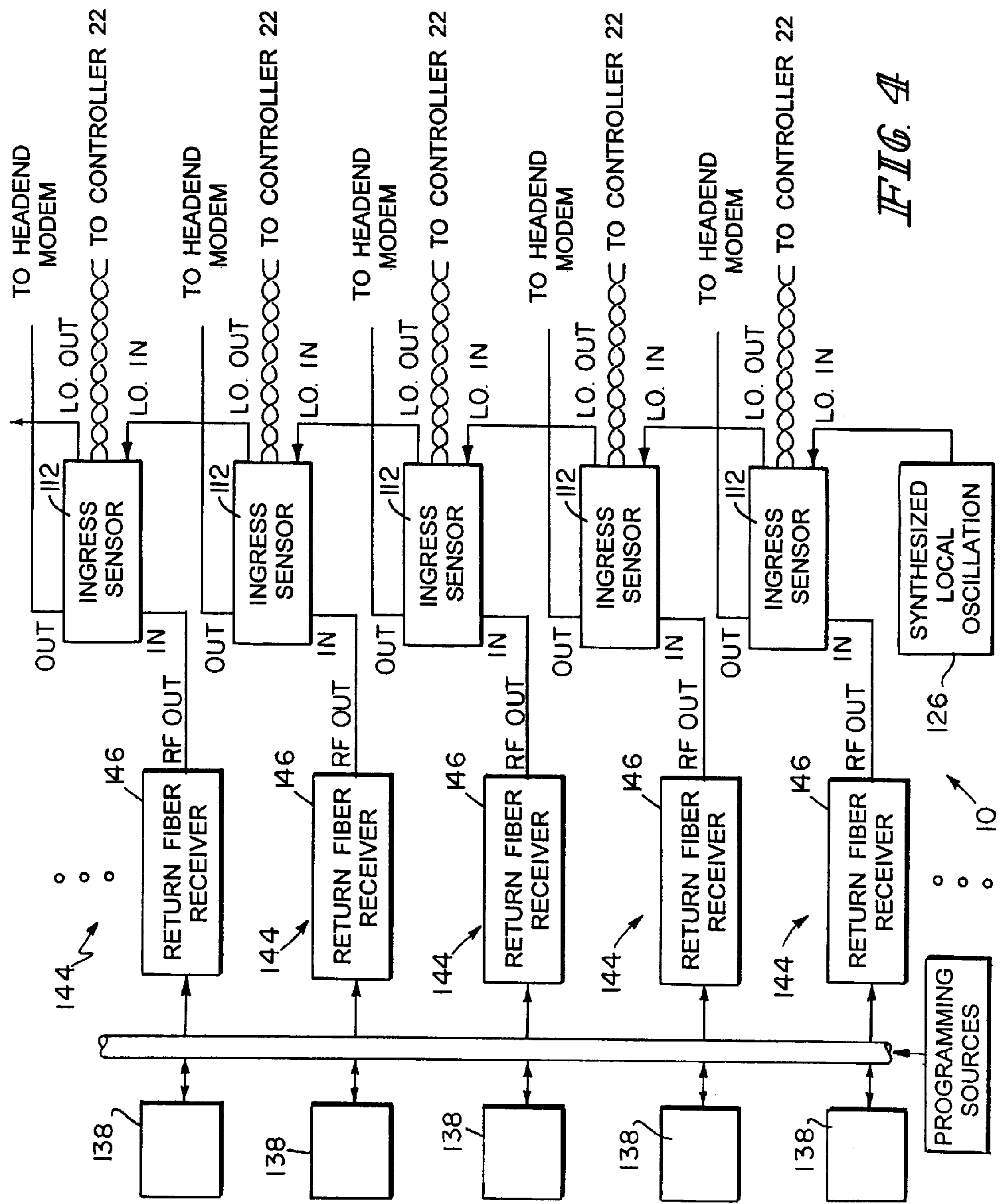

Referring to FIGS. 1, 2 and 4, a system 10 constructed according to the invention can include one or more broadband, peak-holding RF detector circuits 12. Each circuit 12 detects RF at all frequencies within the return path 14 spectrum. The return path of a CATV network is coupled through one or more stages of RF amplification, as appropriate, to an input port of a detector 16. An output port of detector 16 is coupled to an input port of a low pass filter 18 having a corner frequency of, for example, <100 KHz, to limit the video bandwidth. An output port of the low pass filter 18 is coupled to an input port of a peak-following detector 20. The cutoff frequency of the peak-following detector 20 is selected to set the minimum duration of ingress bursts that the circuit 12 is able to detect. The peak-following detector 20 has an attack time appropriate for the shortest impulse duration that the low pass filter 18 admits, and retains the peak detected voltage until that voltage is dumped by a signal from a system controller such as, for example, the system controller 22 illustrated in FIG. 3.

The system 10 can also include one or more narrow band peak-holding RF detector modules 112. Each module 112 also includes a detector element 116, an input port of which is coupled through one or more stages of RF amplification, as appropriate, to, for example, the return path of a CATV network. An output port of detector element 116 is coupled to an input port of a low pass filter 118. An output port of the low pass filter 118 is coupled to an input port of a peak-following detector 120. Before the detector element 116, however, is a variable bandpass circuit 124 which permits only a selected range of return path 14 spectrum frequencies, rather than the full return path 14 frequency spectrum, to pass through to the detector element 116. An input port of the variable bandpass circuit 124 is coupled to receive the entire return path 14 frequency spectrum. The bandpass circuit 124 is made tunable by, for example, a local oscillator 126 and mixer 128, the local oscillator 126 being illustrated in FIGS.

2 and 4 as tunable and common to a number of detector modules 112 for economy and flexibility in manufacture and application. Alternatively, a separate fixed frequency oscillator 126 output can be mixed in each respective mixer 128 with the signal at the input port of the respective variable bandpass circuit 124. In either event, the oscillator 126 output signals can be crystal controlled, digitally synthesized, or generated in any other suitable manner which will provide the desired oscillator 126 output signal frequencies to mix in the respective mixers 128 with the input signals at the input ports of respective variable bandpass circuits 124.

Referring now particularly to FIG. 3, the system 10 further includes a system 10 controller 22. Illustratively, but by no means necessarily, the controller 22 is modular. The controller 22 embodies a multiplex function to sample the held (20, 120) peaks at each detector module 12, 112. The controller 22 further includes a processor/memory combination 130 for logging measurements of the sampled (20, 120) voltages, for comparing the measurements to user-defined limits, and for taking action in the event a measurement exceeds a user defined limit. Such action might include, for example, transmitting a message to a PC for display to a system manager, initiating a page to a system manager, closing a pair of contacts, and/or the like.

The controller 22 and detectors 12, 112 further include circuitry 132 to hold (20, 120) a peak from a respective detector module 12, 112 once the peak has been detected, and to discharge the held (20, 120) peak of a respective detector module 12, 112 once the held (20, 120) peak has been sampled by the controller 22. The various detector modules 12, 112 are then prepared to hold subsequent samples.

The controller 22 further includes circuitry 134 to permit the controller 22 to synchronize its operations to the timing of a polling controller 136, typically a computer, which manages the traffic on the return path side 14 of the CATV network. This permits the ingress monitoring system 10, when it is operating in certain modes, to take measurements during intervals when there is no subscriber traffic in the return path 14.

Illustratively, the controller 22 emulates one of the polled subscriber return signaling terminal devices 138 operating in the frequency band of interest. The controller 22 is assigned a polling address, just as are the subscriber terminal devices 138. This address is entered into the polling computer 136 by the CATV system operator in the same manner as are the addresses of subscriber terminal devices 138. When the polling computer 136 polls the controller 22, the controller 22 discharges all of the detector modules 12, 112, preparing them to receive and hold subsequent samples. Since no subscriber terminal device 138 is transmitting during this interval, noise immunization is practically assured.

Further illustratively, the controller 22 can be synchronized using a digital connection directly to the polling computer 136 if the polling computer 136 is equipped to provide such a connection.

In operation, the system 10 is capable of operating in different modes. The modes can be time-division multiplexed. Each mode is intended to monitor a characteristic of the return path and provide a record of the monitored characteristic. The most straightforward of the modes of operation is the broadband mode. In this mode, a broadband detector circuit 12 is coupled to the RF output port 140 of each return optical fiber receiver. The controller 22 samples the peak held voltages of all of the detectors 12 sequentially by sequentially momentarily closing and then opening each of the data collector switches 141 associated with controller 22, analog-to-digital(A/D) converting the sampled voltages, and then comparing each A/D converted voltage to (a) user-preset limit(s) stored in the controller 22's memory 142. Multiple limits may be desirable. For example, a user may wish to have "caution," or "yellow," as well as "overload," or "red," limits, or different limits or sets of limits, for each channel 144 or different groups of channels 144, and these different combinations are within the contemplation of this disclosure. Scanning of the various detectors 12 in this broadband mode occurs very rapidly, since only a single DC voltage need be measured at each detector 12. Sampling rates on the order of 100 channels per second are desirable and imminently achievable with existing hardware.

Referring to FIG. 4, in another, narrow band, mode of operation, narrow band detector circuits 112 are coupled to the RF output ports 140 of respective return optical fiber receivers 146. The detectors 112 are tuned 126, 128 to the return transmitting frequencies of the service which are to be protected from in-band ingress. Operated in the asynchronous mode, the system 10 measures the peak strengths of signals transmitted by the subscriber devices 138 as they are polled by the service's managing computer 136. Operated in the synchronous mode, the system 10 only performs measurements when the managing computer 136 notifies it that no subscriber device 138 is transmitting. This measurement thus determines the level of in-band ingress affecting particular bands as the detectors 112 tuned to monitor those bands are interrogated.

It should also be recognized that by comparing the asynchronous and synchronous data, the system 10 can calculate the in-band carrier-to-noise ratio. If this function is implemented, another value, carrier-to-(ingress+noise)(C/(I+N)) becomes available as a user-selectable limit against which the detector 12, 112 output port voltages can be compared.

The system 10 thus offers the advantage of speed in its ability to detect ingress bursts microseconds in duration from a relatively inexpensive suite of equipment. Additionally, the system 10 captures transients having durations set only by the detector 12's, 112's low pass filters 18, 118, 124, and hold these measurements pending access to the captured measurements by the system's controller 22.

Further, because the data to be sampled and captured by the controller 22, namely, DC voltage levels, is relatively straightforward, the system 10 speed can be relatively high, on the order of hundreds of test points per second. Consequently, several measurements of the output of a single detector 12, 112 can be obtained in a second or over a few seconds. The data can thus be used to perform statistically meaningful analyses of the output voltages of the various detectors 12, 112.

The principles of operation of the system 10 are straightforward, making demonstration, installation and use relatively easy.

The present system 10 is relatively inexpensive. Further, since a single controller 22 operates several detector circuits 12, 112, and since the detector circuits 12, 112 themselves are relatively inexpensive, the basic system 10 is flexible enough to use with a broad range of sizes of CATV systems.

What is claimed is:

1. A noise monitoring system comprising a detector circuit coupled to the return path of a two-way CATV system, the detector circuit providing an output signal indicative of the signal coupled from the return path of a two-way CATV system, and a peak follower circuit coupled to the detector circuit for storing a peak detected output signal from the detector circuit.

2. The system of claim 1 wherein the peak follower circuit is coupled to the detector circuit through a filter circuit having a defined frequency range, the peak follower circuit storing a peak detected output signal within the defined frequency range.

3. The system of claim 2 wherein the filter circuit comprises a low pass filter circuit.

4. The system of claim 1 further comprising a mixer for mixing the signal from the return path of a two-way CATV system with a local oscillator frequency to produce a mixed signal, and for supplying the mixed signal to the detector circuit.

5. The system of claim 4 wherein the mixed signal is supplied to the detector circuit through a low pass filter.

6. The system of claim 1 wherein the peak follower circuit has a characteristic attack time so that the peak follower circuit stores a peak detected output signal having a defined minimum duration from the detector circuit.

7. The system of claim 1 further comprising a controller coupled to the peak follower circuit and configured to receive the amplitude of the stored peak signal.

8. The system of claim 7 wherein the controller is configured to receive the amplitude of the stored peak signal periodically.

9. The system of claim 7 wherein the controller is further configured to generate a message if the amplitude of the stored peak signal exceeds a defined threshold.

10. A system for monitoring the ingress of noise into the return path of a two-way CATV network, the system comprising a detector circuit coupled to the return path to receive a signal from the return path, the detector circuit providing an output signal indicative of the signal coupled from the network, and a peak follower circuit coupled to the detector circuit for storing a peak detected output signal from the detector circuit.

11. The system of claim 10 wherein the peak follower circuit is coupled to the detector circuit through a filter circuit having a defined frequency range, the peak follower circuit storing a peak detected output signal within the defined frequency range.

12. The system of claim 11 wherein the filter circuit comprises a low pass filter circuit.

13. The system of claim 10 further comprising a mixer for mixing the signal from the network with a local oscillator frequency to produce a mixed signal, and for supplying the mixed signal to the detector circuit.

14. The system of claim 13 wherein the mixed signal is supplied to the detector circuit through a low pass filter.

15. The system of claim 10 wherein the peak follower circuit has a characteristic attack time so that the peak follower circuit stores a peak detected output signal having a defined minimum duration from the detector circuit.

16. The system of claim 10 further comprising a controller coupled to the peak follower circuit and configured to receive the amplitude of the stored peak signal.

17. The system of claim 16 wherein the controller is configured to receive the amplitude of the stored peak signal periodically.

18. The system of claim 16 wherein the controller is further configured to generate a message if the amplitude of the stored peak signal exceeds a defined threshold.

19. A noise monitoring system comprising a plurality of detectors, a plurality of peak follower circuits, each peak follower circuit coupled to a respective one of the detectors for storing peak detected output signals from respective ones of the detectors, and a controller coupled to the peak follower circuits and configured to receive the amplitudes of the stored peak signals, the controller comprising a controller for interrogating the plurality of peak follower circuits in an established order, for receiving the amplitudes of the stored peak signals from the plurality of peak follower circuits, for subsequently deleting the amplitudes of the stored peak signals, and then for repeating this cycle.

20. The system of claim 19 wherein each peak follower circuit is coupled to a respective detector circuit through a respective filter circuit having a defined frequency range, each peak follower circuit storing a peak detected output signal within the defined frequency range.

21. The system of claim 20 wherein each filter circuit comprises a low pass filter circuit.

22. The system of claim 19 further comprising a mixer for mixing the signal from the signal source with a local oscillator frequency to produce a mixed signal, and for supplying the mixed signal to a respective detector circuit.

23. The system of claim 22 wherein the mixed signal is supplied to a respective detector circuit through a respective low pass filter.

24. The system of claim 19 wherein each peak follower circuit has a characteristic attack time so that the peak follower circuit stores a peak detected output signal having a defined minimum duration from the detector circuit.

25. The system of claim 19 wherein the controller is configured to receive the amplitudes of the stored peak signals periodically.

26. The system of claim 19 wherein the controller is further configured to generate a message if the amplitude of a stored peak signal exceeds a defined threshold.

27. The system of claim 19, 20, 21, 22, 23, 24, 25 or 26 wherein the signal source is the return path of a two-way CATV system.

28. A system for monitoring the ingress of noise into the return path of a two-way CATV network, the system comprising a plurality of detectors, a plurality of peak follower circuits, each peak follower circuit coupled to a respective one of the detectors for storing a peak detected output signal from the respective one of the detectors, and a controller coupled to the peak follower circuits and configured to receive the amplitudes of the stored peak signals, the controller comprising a polling controller for polling the plurality of peak follower circuits in an established order, for receiving the amplitudes of the stored peak signals from the plurality of peak follower circuits for a time, for deleting the amplitudes of the stored peak signals after the expiration of the time, and then for repeating this cycle.

29. The system of claims 28 wherein the peak follower circuits are coupled to respective detector circuits through respective filter circuits having defined frequency ranges, the peak follower circuits storing peak detected output signals within the defined frequency ranges.

30. The system of claim 29 wherein the filter circuits comprise low pass filter circuits.

31. The system of claim 28 further comprising a mixer for mixing the signal from the network with a local oscillator frequency to produce a mixed signal, and for supplying the mixed signal to one of said detector circuits.

32. The system of claim 31 wherein the mixed signal is supplied to said one of said detector circuits through a low pass filter.

33. The system of claim 28 wherein each said peak follower circuit has a characteristic attack time so that each said peak follower circuit stores a peak detected output signal having a defined minimum duration from a respective detector circuit.

34. The system of claim 28 wherein the controller is configured to receive the amplitudes of the stored peak signals periodically.

35. The system of claim 28 wherein the controller is further configured to generate a message if the amplitude of a stored peak signal exceeds a defined threshold.

36. A noise monitoring system comprising a detector circuit coupled to an electrical signal source, the detector circuit providing an output signal indicative of the signal coupled from the source, a peak follower circuit coupled to the detector circuit for storing a peak detected output signal from the detector circuit, and a controller coupled to the peak follower circuit and configured to receive and store the amplitude of the stored peak signal and to generate a message if the amplitude of the stored peak signal exceeds a defined threshold.

37. The system of claim 36 wherein the controller discharges the held peak of the peak follower circuit once the peak has been detected and stored in the controller.

38. The system of claim 36 wherein the controller includes a processor and memory combination for logging measurements of the output signal.

39. The system of claim 38 wherein the controller is synchronized to the operation of a computer.

40. A noise monitoring system comprising a mixer for mixing a signal from a signal source with a local oscillator frequency to produce a mixed signal, a detector circuit for receiving the mixed signal from the mixer, the detector circuit providing an output signal indicative of the signal coupled from the source, a peak follower circuit coupled to the detector circuit for storing a peak detected output signal from the detector circuit, a controller coupled to the peak follower circuit and configured to receive and store the amplitude of the stored peak signal.

41. The system of claim 40 wherein the mixed signal is supplied to the detector circuit through a low pass filter.

42. The system of claim 41 wherein the peak follower circuit has a characteristic attack time so that the peak follower circuit stores a peak detected output signal having a defined minimum duration from the detector circuit.

43. The system of claim 37 wherein the controller includes a processor and memory combination for logging measurements of the output signal.

44. The system of claim 43 wherein the controller is synchronized to the operation of a computer.

* * * * *